United States Patent
Dara, Jr. et al.

(10) Patent No.: US 9,008,908 B2
(45) Date of Patent: Apr. 14, 2015

(54) HEAD-UP DISPLAY AND METHOD WITH SPEED SENSITIVE LIGHT INTENSITY

(71) Applicants: DENSO International America, Inc., Southfield, MI (US); Denso Corporation, Kariya (JP)

(72) Inventors: Chester Peter Dara, Jr., Sterling Heights, MI (US); Carlin Bjork Blanton, South Lyon, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 15 days.

(21) Appl. No.: 13/937,876

(22) Filed: Jul. 9, 2013

(65) Prior Publication Data

US 2015/0019072 A1    Jan. 15, 2015

(51) Int. Cl.
| | |
|---|---|
| G06F 7/00 | (2006.01) |
| G02F 1/01 | (2006.01) |
| G02B 27/01 | (2006.01) |
| G02B 6/00 | (2006.01) |
| B60K 35/00 | (2006.01) |

(52) U.S. Cl.
CPC .......... *G02F 1/0121* (2013.01); *G02B 27/0101* (2013.01); *G02B 6/00* (2013.01); *G02B 2027/0118* (2013.01); *B60K 35/00* (2013.01)

(58) Field of Classification Search
CPC .............. B60K 2350/1024; B60K 2350/1028; B60K 35/00; B60D 1/36; B60D 1/58; B60Q 3/004; B60R 1/207; B60R 11/0235; G02B 6/00; G02B 2027/0118
USPC ................ 701/36, 45, 66, 93; 340/425.5, 438
See application file for complete search history.

(56) References Cited

U.S. PATENT DOCUMENTS

| | | | |
|---|---|---|---|
| 4,603,973 A * | 8/1986 | Crow | ........................... 356/5.04 |
| 4,831,366 A | 5/1989 | Iino | |
| 5,034,732 A | 7/1991 | Iino | |
| 6,447,132 B1 | 9/2002 | Harter, Jr. | |
| 6,789,901 B1 | 9/2004 | Kormos | |
| 6,897,892 B2 | 5/2005 | Kormos | |
| 7,106,293 B2 | 9/2006 | Pirhonen | |
| 7,164,117 B2 * | 1/2007 | Breed et al. | ................... 250/221 |
| 7,731,403 B2 * | 6/2010 | Lynam et al. | ................. 362/547 |

* cited by examiner

*Primary Examiner* — Gertrude Arthur Jeanglaude
(74) *Attorney, Agent, or Firm* — Harness, Dickey & Pierce, PLC

(57) ABSTRACT

A head-up display light source intensity control for a vehicle can include sensing an ambient light intensity condition and providing ambient light intensity data indicative of the ambient light intensity condition to a controller. A speed of the vehicle is sensed and vehicle speed data indicative of the speed of the vehicle is provided to the controller. The controller is configured to calculate a light intensity output value for the head-up display based on both the ambient light intensity data and the vehicle speed data. The light intensity output of a light source of the head-up display is adjusted based upon the light intensity output value.

20 Claims, 2 Drawing Sheets

HEAD-UP DISPLAY AND METHOD WITH SPEED SENSITIVE LIGHT INTENSITY

FIELD

The present disclosure relates to a head-up display, and more particularly to control of the light intensity or brightness of the head-up display.

BACKGROUND

This section provides background information related to the present disclosure which is not necessarily prior art.

Head up displays (HUD) are known and are currently used in many military and commercial aircraft. HUDs are also finding application in automobiles. Conventionally, a HUD unit is mounted in the automobile to project an image in front of the driver. Adapting HUD units for use in automobiles necessitates making the units rugged, reliable, cost effective, and functional in a wide range of environmental and ambient lighting conditions.

One problem with HUDs in automobiles is maintaining satisfactory image illumination over a wide range of ambient lighting conditions. These ambient lighting conditions span from the extremely bright daylight lighting conditions of facing direct sunlight to the very dim nighttime lighting conditions of unlit rural highways. Daylight conditions generally require a bright or high intensity light source so that the projected image is visible in the corresponding bright ambient light conditions. Conversely, nighttime or low light conditions require a dim or low intensity light source to provide a projected image that is safe and comfortable in the corresponding dim ambient light conditions.

A HUD can use a light sensor to detect the ambient lighting conditions. Such a light sensor, however, can in some cases detect a sudden change in ambient light conditions that does not truly reflect the ambient lighting conditions. For example, as an automobile passes under a series of street lights, the light sensor can read each successive street light as a bright ambient daylight condition and each space between the street lights as a dim ambient nighttime condition. The resulting quick toggling between daylight and nighttime HUD light source intensities is not only annoying, but can be unsafe and detrimental to the reliability and service life of the HUD.

SUMMARY

This section provides a general summary of the disclosure, and is not a comprehensive disclosure of its full scope or all of its features, nor is everything included in this section necessarily an essential aspect of the disclosure.

In one aspect of the present disclosure a method of controlling a light intensity output of a head-up display for a vehicle is provided. The method includes configuring a controller to obtain ambient light intensity data. The controller is also configured to obtain vehicle speed data. The controller is further configured to adjust the light intensity output of the head-up display based on both the ambient light intensity data and the vehicle speed data.

In another aspect of the present disclosure a method of controlling a light intensity output of a head-up display for a vehicle is provided. The method includes sensing an ambient light intensity condition and providing ambient light intensity data indicative of the ambient light intensity condition to a controller. A speed of the vehicle is sensed and vehicle speed data indicative of the speed of the vehicle is provided to the controller. The controller is configured to calculate a light intensity output value for the head-up display based on both the ambient light intensity data and the vehicle speed data. The light intensity output of a light source of the head-up display is adjusted based upon the light intensity output value.

In yet another aspect of the present disclosure a head-up display for a vehicle includes a controller. An ambient light intensity sensor is configured to provide ambient light intensity data to the controller. A vehicle speed sensor is configured to provide vehicle speed data to the controller. The controller is configured to calculate a light intensity output of the head-up display based upon both the ambient light intensity data and the vehicle speed data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
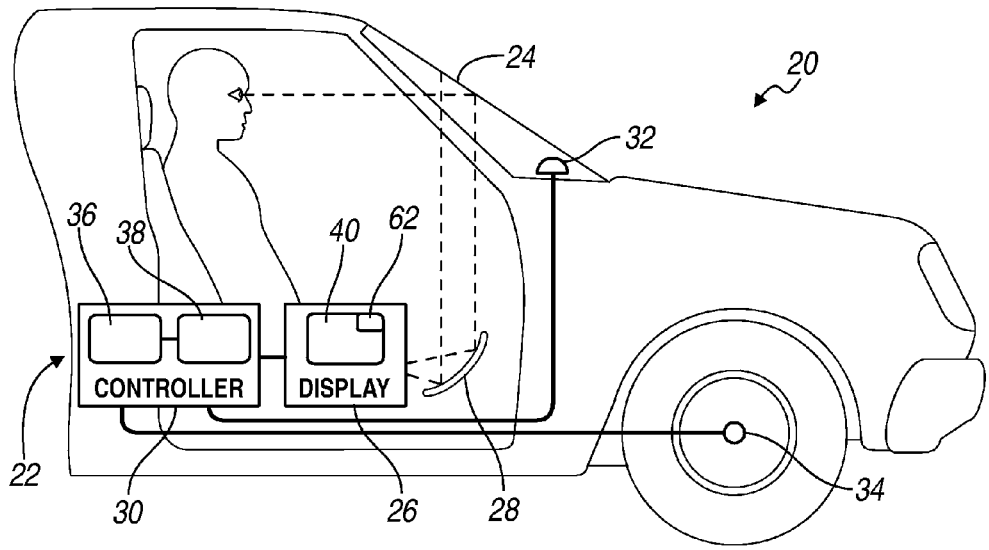
FIG. 1 is a schematic view of an automobile incorporating an exemplary HUD in accordance with the present disclosure.
Figure 2:
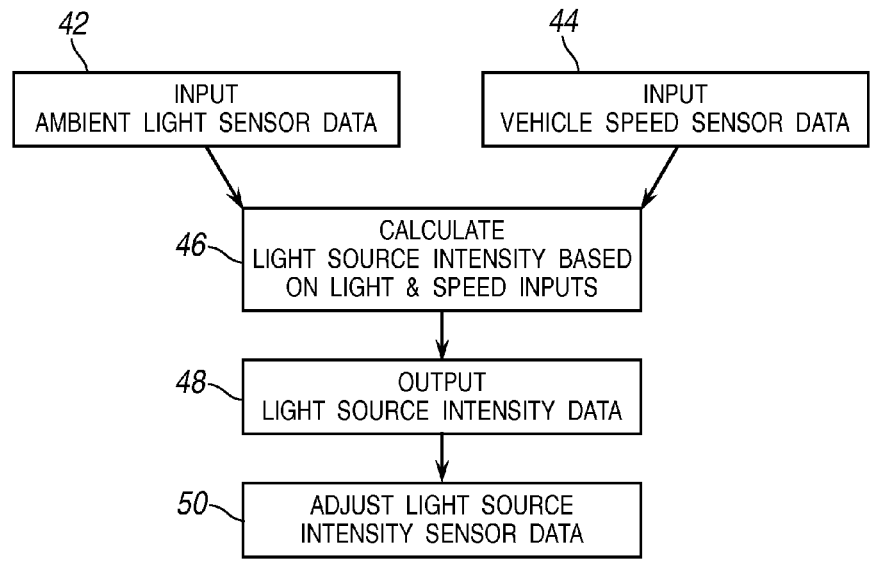
FIG. 2 is a flow chart of various steps performed by the HUD of FIG. 1.

Referring to FIGS. 1 and 2, an automobile 20 is shown equipped with a head-up display system (HUD) 22. The HUD 22 can communicate information to the vehicle operator that can be projected on a viewable display surface 24 in front of the operator. For example, the viewable display surface 24 can be the windshield or a transparent plate adjacent the windshield. A display unit (i.e., an image source) 26 can provide and project an image via a mirror 28 to the display surface 24. The HUD 22 can allow the operator to view the image without taking his eyes off of the road.

The HUD 22 can also include a controller 30. The controller 30 can include memory 36, one or more microprocessors 38 and related circuitry. The controller 30 can be an integrated separate component, or can be wholly or partially integrated into the display 26. The controller 30 can receive data from various systems or sensors (not shown), including for example, an infrared sensor for detecting objects in the roadway ahead of the vehicle, one or more engine sensors providing engine parameter data, and GPS sensors providing position related data, just to name a few.

The controller 30 formats selected data that it receives into a suitable display signal that is communicated to the display unit 26. Responsive to the display signal, the display unit 26 can generate and project the desired image. The display unit 26 can include a light source 40 having an adjustable light intensity. For example, the display unit 26 can be an active matrix liquid crystal display with an adjustable backlight as the adjustable intensity light source 40. The light sensor 32, controller 30, and display unit 26 can all be contained within an integral HUD module.

The controller 30 can also receive ambient light data from a light sensor 32 and can receive speed data from a speed sensor 34. The speed sensor 34 need not be a separate single-purpose sensor, but can comprise a GPS system that senses speed by executing an appropriate algorithm converting distance traveled over time to speed.

The controller 30 can receive inputs of the ambient light data at box 42 from the light sensor 32 and the speed data at box 44 from the speed sensor 34 into a light intensity algorithm at box 46 which outputs light intensity data at box 48. The controller 30 can use the calculated light intensity data of box 46 to send a light intensity signal to the light source 40 or otherwise adjust the intensity of the light source 40 using the calculated light intensity data at box 50.

Light source 40 can include one or more light sources 62 that can be directly or indirectly controlled by controller 30. For example, light sources 62 can include one or more halogen bulbs that produce bright light and one or more florescent lights or LED's that produce dimmer light. Thus, adjusting the light source intensity can include adjusting the power input to one or more light sources 62, or turning one or more of the light sources 62 on or off, or both.

One exemplary light source algorithm that the controller can use at box 46 is:

$$\text{Light source intensity} = k*(\text{light sensor data}) + (1-k)*(\text{Light intensity filter})$$

wherein:
$k = 1 - e^{[ln(1-F)*(Ts/Tr)]}$;
e = constant (sometimes referred to as "Euler's number")
F = minimum accuracy with which to change at Time T;
Ts = sample rate;
Tr = vehicle speed; and
"Light intensity filter" can be any standard algorithm used in an HUD for calculating a light intensity value based on ambient light sensor data (i.e., without factoring in vehicle speed).

The controller 30 can be configured to perform such a light source intensity calculation using software, hardware (e.g., circuitry), or a combination of the two. Factoring both ambient light sensor data and speed data inputs into the determination (i.e., using a dynamic (ambient light and speed input) filter) of the calculated light intensity value to be used in displaying an image of the HUD 22 can avoid safety and reliability issues associated with repeated improper and unnecessary adjustments of the light source intensity of the light source 40 of the HUD 22 (i.e., that occur using a static (ambient light input only) filter).

Figure 3:
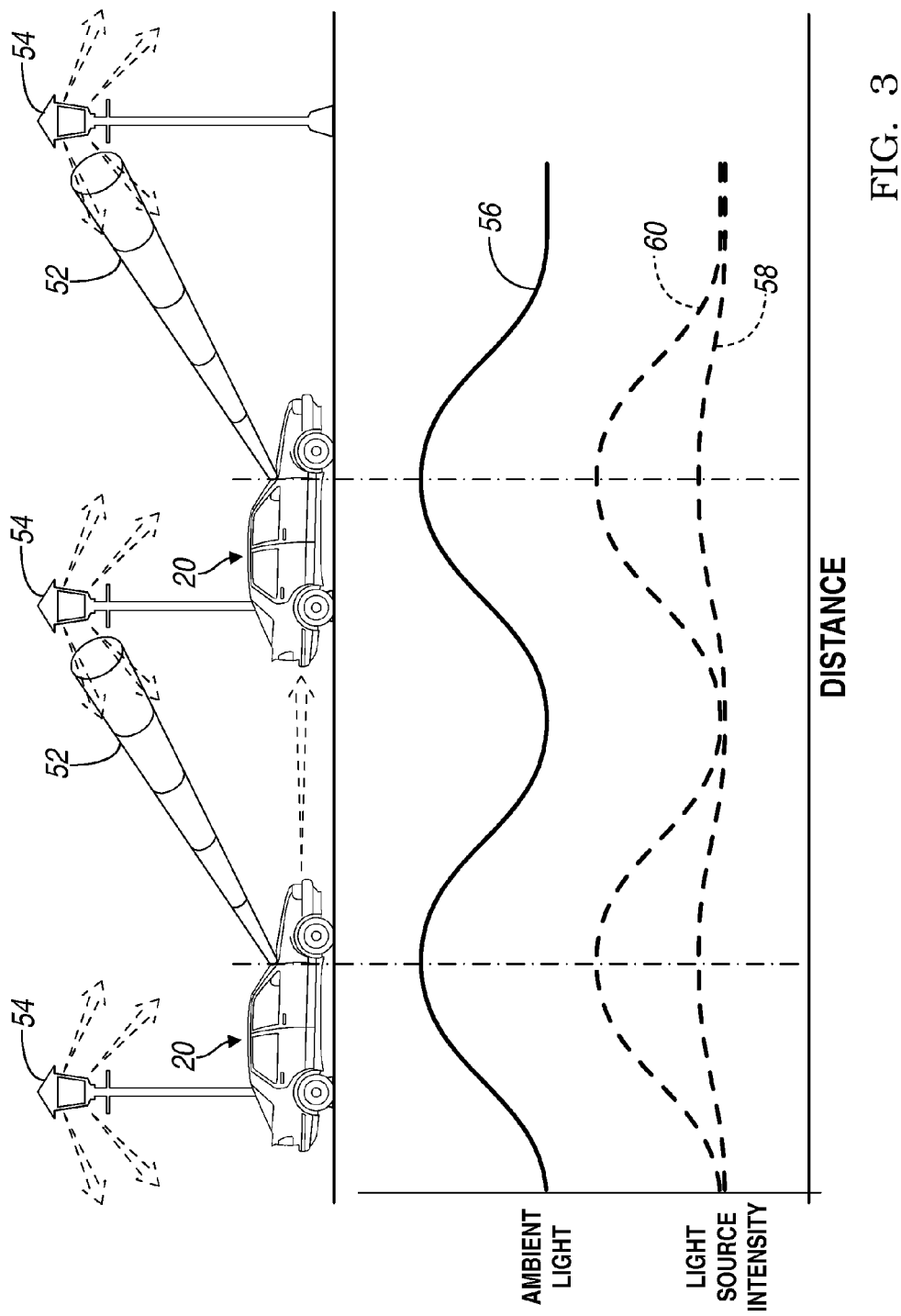
FIG. 3 is a graph of light intensity over distance and an associated pictorial representation of the environment.

Referring to FIG. 3, the ambient light sensor 32 (FIG. 1) can have a viewing cone 52 projecting forward of the vehicle 20 at an angle. When traveling at night, as light from each successive street light 54 falls into the viewing cone 52, the ambient light sensor 32 can read the ambient light condition as bright or daylight. As the viewing cone 52 passes between the street lights, the ambient light sensor 32 can read the ambient light condition as dim or nighttime. Such ambient light sensor data readings are plotted along the line 56 at the top of the graph of FIG. 3.

The light source intensities calculated based on an exemplary "Light intensity filter" using a standard algorithm for calculating light intensity values for a HUD based on ambient light sensor data (i.e., without factoring in vehicle speed) are plotted along the line 58 at the bottom of the graph for the situation in which the vehicle 20 is traveling relatively fast. Due to the relatively high speed of the vehicle 20, the amount of time during which the ambient light sensor 32 reads each street light 54 is relatively short. As a result, the standard algorithm does not make a significant adjustment to the light source intensity during this relatively short time period.

The light source intensities calculated based on standard "Light intensity filter" algorithms are quite different, however, when the vehicle 20 is traveling slowly. Due to the relatively slow vehicle speed, the amount of time during which the ambient light sensor 32 reads each street light 54 is relatively long. Thus, such a standard algorithm does make a significant adjustment to the light source intensity as a result of sensing light from each street light. For such a low-speed situation, it can be seen that such calculated light intensity values, which are plotted along line 60, move significantly up and down and generally mirror the plot of the ambient light sensor 32. This can result in fairly rapid, repeated, unnecessary, and unwanted changes to the light source intensity of the HUD 22, which can compromise safety (e.g., momentary night-blindness) and HUD reliability (e.g., service life).

Light source intensities calculated based on both ambient light intensity data and vehicle speed data (e.g., using the above algorithm) can reduce the changes in calculated light source intensities occurring over a distance traveled, regardless of vehicle speed. This can significantly reduce the potential for such rapid, repeated, unnecessary, and unwanted changes to the HUD light source intensity. Thus, the calculation can use an algorithm (such as identified above) that calculates light source intensity values that are substantially the same regardless of vehicle speed and similar to line 58 plotted at the bottom of FIG. 3.

It can be appreciated in view of line 58 plotting the light source intensities, that the distance-based rate of change in intensities (i.e., delta intensity/distance) can be substantially the same regardless of the speed of the vehicle. It can also be appreciated in view of the calculated light source intensities of line 58, that the time-based rate of change in intensities (i.e., delta intensity/time) can be greater when the vehicle is traveling faster and can be less when the vehicle is traveling slower. Another way of saying this is, the light intensity can change faster when the vehicle is traveling faster and slower when the vehicle is traveling slower.

The controller 30 can provide a first time-based rate of change in the light intensity output value at a first high vehicle speed that is greater than a second time-based rate of change in the light intensity output value at a second low vehicle speed.

The controller 30 can provide a first distance-based rate of change in the light intensity output at a first high vehicle speed that is substantially the same as the distance-based rate of change in the light intensity output at a second low vehicle speed, and wherein the second low vehicle speed is no more than 25%, 50%, or 75% of the first high vehicle speed.

The controller 30 can provide changes in a magnitude of the light intensity output that are proportional to the speed of the vehicle so that proportionally higher vehicle speeds result in proportionally larger changes in the magnitude of the light intensity output.

The controller 30 can provide changes in the light intensity output at a periodic rate that is proportional to the speed of the vehicle so that proportionally higher vehicle speeds result in proportionally faster changes in the periodic rate of the light intensity output. The controller 30 can provide any of the above singly, or in combination with the other ways of calculating light intensity outputs discussed above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling a light intensity output of a head-up display for a vehicle comprising:
providing a controller;
providing ambient light intensity data from a light sensor to the controller;
providing vehicle speed data from a speed sensor to the controller; and
adjusting the light intensity output of the head-up display based on both the ambient light intensity data and the vehicle speed data using the controller.

2. The method of controlling a light intensity output of a head-up display of claim 1, wherein adjusting the light intensity output comprises providing a first time-based rate of change in the light intensity output at a first high vehicle speed that is greater than a second time-based rate of change in the light intensity output at a second low vehicle speed.

3. The method of controlling a light intensity output of a head-up display of claim 1, wherein adjusting the light intensity output comprises providing a first distance-based rate of change in the light intensity output at a first high vehicle speed that is substantially the same as the distance-based rate of change in the light intensity output at a second low vehicle speed.

4. The method of controlling a light intensity output of a head-up display of claim 1, wherein adjusting the light intensity output comprises providing a first time-based rate of change in the light intensity output at a first high vehicle speed that is greater than a second time-based rate of change in the light intensity output at a second low vehicle speed, and providing a first distance-based rate of change in the light intensity output the first high vehicle speed that is substantially the same as a second distance-based rate of change in the light intensity output at the second low vehicle speed.

5. The method of controlling a light intensity output of a head-up display in a vehicle of claim 1, wherein adjusting the light intensity output comprises providing changes in a magnitude of the light intensity output that are proportional to the speed of the vehicle so that proportionally higher vehicle speeds result in proportionally larger changes in the magnitude of the light intensity output.

6. The method of controlling a light intensity output of a head-up display in a vehicle of claim 1, wherein adjusting the light intensity output comprises providing changes in the light intensity output at a periodic rate that is proportional to the speed of the vehicle so that proportionally higher vehicle speeds result in proportionally faster changes in the periodic rate of the light intensity output.

7. A method of controlling a light intensity output of a head-up display for a vehicle comprising:
providing a controller;
sensing an ambient light intensity condition using a light sensor;
providing ambient light intensity data indicative of the ambient light intensity condition to the controller;
sensing a speed of the vehicle using a speed sensor;
providing vehicle speed data indicative of the speed of the vehicle to the controller;
calculating a light intensity output value for the head-up display based on both the ambient light intensity data and the vehicle speed data using the controller; and
adjusting the light intensity output of a light source of the head-up display based upon the light intensity output value.

8. The method of controlling a light intensity output of a head-up display in a vehicle of claim 7, wherein adjusting the light intensity output comprises providing a first time-based rate of change in the light intensity output at a first high vehicle speed that is greater than a second time-based rate of change in the light intensity output at a second low vehicle speed.

9. The method of controlling a light intensity output of a head-up display in a vehicle of claim 7, wherein adjusting the light intensity output comprises providing a first distance-based rate of change in the light intensity output at a first high vehicle speed that is substantially the same as the distance-based rate of change in the light intensity output at a second low vehicle speed.

10. The method of controlling a light intensity output of a head-up display in a vehicle of claim 7, wherein adjusting the light intensity output comprises providing changes in a magnitude of the light intensity output that are proportional to the speed of the vehicle so that proportionally higher vehicle speeds result in proportionally larger changes in the magnitude of the light intensity output.

11. The method of controlling a light intensity output of a head-up display in a vehicle of claim 7, wherein adjusting the light intensity output comprises providing changes in the light intensity output at a periodic rate that is proportional to the speed of the vehicle so that proportionally higher vehicle speeds result in proportionally faster changes in the periodic rate of the light intensity output.

12. The method of controlling a light intensity output of a head-up display in a vehicle of claim 7, further comprising incorporating the head-up display in the vehicle, which is an automobile.

13. A head-up display for a vehicle comprising:
a controller;
an ambient light intensity sensor providing ambient light intensity data to the controller; and
a vehicle speed sensor providing vehicle speed data to the controller; and
wherein the controller calculates a light intensity output of the head-up display based upon both the ambient light intensity data and the vehicle speed data.

14. The head-up display of claim 13, wherein a first time-based rate of change in the light intensity output at a first high vehicle speed that is greater than a second time-based rate of change in the light intensity output at a second low vehicle speed is provided to the controller.

15. The head-up display of claim 13, wherein a first distance-based rate of change in the light intensity output at a first high vehicle speed that is substantially the same as the distance-based rate of change in the light intensity output at a second low vehicle speed is provided to the controller.

16. The head-up display of claim 13, wherein a first time-based rate of change in the light intensity output at a first high vehicle speed that is greater than a second time-based rate of change in the light intensity output at a second low vehicle speed, and a first distance-based rate of change in the light intensity output the first high vehicle speed that is substantially the same as a second distance-based rate of change in the light intensity output at the second low vehicle speed are provided to the controller.

17. The head-up display of claim 13, wherein changes in a magnitude of the light intensity output that are proportional to the speed of the vehicle so that proportionally higher vehicle speeds result in proportionally larger changes in the magnitude of the light intensity output are provided to the controller.

18. The head-up display of claim 13, wherein changes in the light intensity output at a periodic rate that is proportional to the speed of the vehicle so that proportionally higher vehicle speeds result in proportionally faster changes in the periodic rate of the light intensity output are provided to the controller.

19. The head-up display of claim 13, wherein the ambient light intensity sensor includes a sensor viewing cone extending forward of the vehicle at an angle.

20. A vehicle incorporating the head-up display of claim 13, wherein the vehicle is an automobile.

\* \* \* \* \*